United States Patent [19]

Sittner

[11] 3,958,537

[45] May 25, 1976

[54] OIL AND INSECTICIDE DISPENSING APPARATUS FOR LIVESTOCK

[75] Inventor: Edward Sittner, Torrington, Wyo.

[73] Assignee: Sittner Manufacturing Co., Inc., Sheridan, Wyo.

[22] Filed: June 6, 1973

[21] Appl. No.: 367,435

[52] U.S. Cl. ............................ 119/157; 222/518
[51] Int. Cl.² ................................. A01K 29/00
[58] Field of Search ............ 119/156, 157; 222/518, 222/559; 277/DIG. 6

[56] References Cited
UNITED STATES PATENTS

| | | | |
|---|---|---|---|
| 1,045,198 | 11/1912 | Schultz | 119/157 |
| 2,988,051 | 6/1961 | Minock | 119/157 |
| 3,220,617 | 11/1965 | Veistrup | 222/518 X |
| 3,727,586 | 4/1973 | Brewster | 119/157 |

OTHER PUBLICATIONS

New Products and Mat'ls, J. O'Connor, editor, Chemical Engineering, Apr. 1950.

Primary Examiner—J. N. Eskovitz
Attorney, Agent, or Firm—Bruce G. Klaas

[57] ABSTRACT

There is herein disclosed oil and insecticide dispensing apparatus for livestock comprising a one-piece plastic valve housing frictionally retained in a mounting wall with an outlet opening in a rounded end wall cooperably receiving a one-piece plastic spring biased valve plunger movable by animal contact between a closed position and an open position relative to the outlet opening and sealed within the housing of an O-ring made of fluorocarbon plastic material.

4 Claims, 4 Drawing Figures

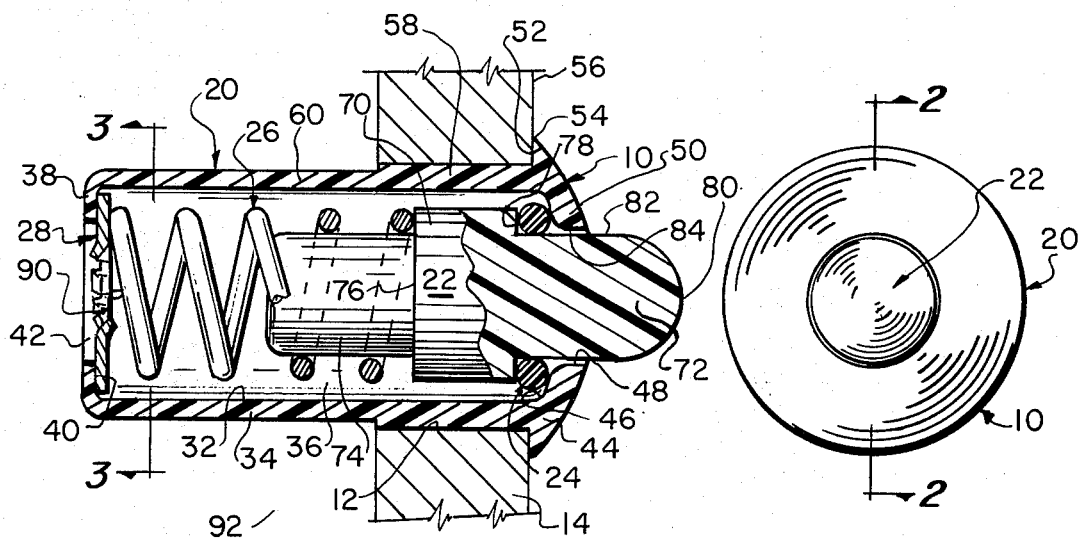
Fig_2  Fig_1
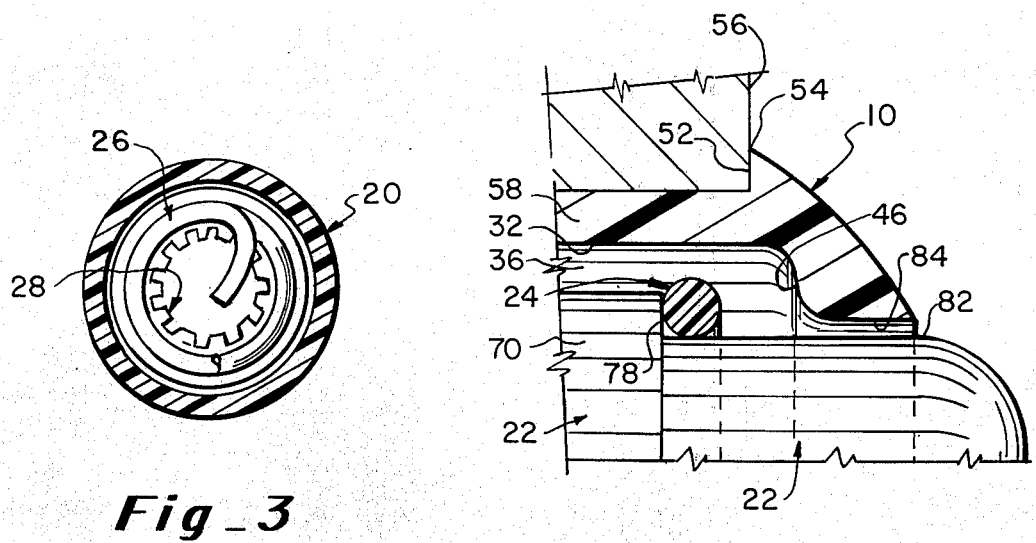
Fig_3  Fig_4

OIL AND INSECTICIDE DISPENSING APPARATUS FOR LIVESTOCK

BACKGROUND AND SUMMARY OF INVENTION

The liquid dispensing valve apparatus of the present invention is adapted for use in livestock oiling and insecticide dispensing apparatus of the general type shown in U.S. Pat. Nos. 2,988,050 and 2,988,051.

One of the problems with such dispensing valve apparatus is to maintain operability under extremely difficult operating conditions without continuous attention of the farmer or rancher. The apparatus must dispense liquid oil and insecticide freely when cattle are present yet close off the dispensing passages completely when the cattle leave. The dispensing apparatus is mounted in the open so as to be subject to extremes of year-round heat, cold, snow, rain, ice, dryness, wind, etc. In addition, the materials dispensed are often relatively corrosive and have a tendency to clog flow passages by themselves or in combination with dirt, blood, animal hair, etc. While all of the foregoing factors can cause clogging of dispensing passages and dispensing valve apparatus, I have discovered that a primary reason for clogging of dispensing valves involves malfunction of the valve apparatus due to reaction between the dispensing valve parts and the materials being dispensed. In particular, I have discovered that conventional O-ring seals, which have heretofore been employed in connection with oil and insecticide dispensing valve apparatus, tend to absorb and react with the oil and the insecticide so as to become inoperable by reason of swelling, disintegration and degradation. In this connection, I have determined that certain types of material are far better suited for use in oil and insecticide dispensing apparatus for cattle. Another problem is providing a dispensing valve which will dispense enough oil and insecticide without dispensing too much. Also the dispensing valve must be securely mounted so as not to be dislodged by the cattle. Other problems solved by the present invention are difficulties of assembly and mounting of the valve apparatus, unreliable sealing of the valve housing relative to surrounding suppport member, and lack of durability in use.

The afore-recited problems have been overcome in the present invention by providing: (1) a one-piece valve housing member of molded nylon material frictionally sealingly mounted by only an interference fit in a mounting bore in a support plate with a thin edge convexly rounded outlet passage portion extending beyond the support plate, (2) a one-piece valve plunger member of molded nylon material, and (3) an O-ring seal between the plunger member and the housing member made from flurocarbon material which is relatively inert and impermeable with respect to the oil and insecticide dispensed and mounted in a new and improved manner, as more fully described hereinafter by reference to the accompanying drawing.

THE DRAWING

The accompanying drawing discloses new and improved dispensing valve apparatus in which:

FIG. 1 is an end view of dispensing valve apparatus of the present invention;

FIG. 2 is a cross-sectional view of the dispensing valve apparatus taken along line 2—2 in FIG. 1 and showing the apparatus as mounted in associated dispensing apparatus;

FIG. 3 is a cross-sectional view of the dispensing valve apparatus of FIG. 2 taken along line 3—3; and FIG. 4 is an enlarged partial view of a portion of the apparatus shown in FIG. 2.

DETAILED DESCRIPTION

Referring to the drawing, a dispensing valve assembly 10 is shown mounted in fixed sealing engagement with the side surface of a mounting bore 12 provided in a support wall 14 of associated dispensing apparatus of the type shown in U.S. Pat. Nos. 2,988,050 and 2,988,051. It is to be understood that the apparatus of the drawing is of enlarged scale relative to the actual size.

The valve assembly 10 comprises a housing means 20, valve plunger means 22, an O-ring type seal means 24, a compression spring means 26, and a retaining washer means 28.

The housing means 20 comprises an elongated hollow one-piece molded plastic member of generally cylindrical cross-sectional configuration with an inner cylindrical surface 32 of a tubular wall portion 34 defining an elongated cylindrical chamber 36. The housing member is made from a plastic material, such as nylon, which is: (1) relatively rigid and tough so as to easily hold its shape and retain the parts of the assembly, (2) resilient enough in relatively thin wall sections to permit compressive insertion and retention of the assembly in mounting bore 12, (3) relatively inert and impermeable with respect to the oil and insecticide to be dispensed, (4) dimensionally stable so as to be relatively unaffected dimensionally by high and low temperature conditions, and (5) of relatively high lubricity so as to be effectively self-lubricating. A rigid inner end wall 38 extends radially inwardly to define a washer seat 40 and a liquid inlet opening 42. A rigid outer end wall 44 extends radially inwardly to define a curved O-ring seat 46 and a relatively elongated outlet opening 48 of approximately 0.226 inch diameter and approximately 0.065 inch axial length. The outer surface 50 of the end wall 44 has a convex curvature which intersects a radially outwardly extending seating surface 52 to define a somewhat resilient relatively thin edge 54 adapted to be closely seated against the outer surface 56 of the dispensing apparatus wall 14 circumjacent bore 12 so as to prevent parts of animals rubbing against the valve assembly from becoming entangled with or loosening the valve assembly. A length of the outer surface of wall 34 approximately equal to the thickness of wall 14 is uniformly cylindrical throughout with a diameter sufficiently greater than the diameter of bore 12 so as to provide a frictional sealing interference fitting wall portion 58. In the present preferred arrangement, the diameter of bore 12 is approximately 0.432 inch and the diameter of wall portion 58 is approximately 0.455 inch, with the length being approximately 0.255 inch and the thickness being approximately 0.010 inch. The inner portion 60 of wall 34 beyond wall portion 58 is of somewhat smaller outside diameter, approximately 0.440 inch in the presently preferred arrangement, to facilitate assembly and may be tapered for that purpose.

Valve plunger means 22 comprises an elongated solid one-piece molded plastic (nylon being presently preferred) member of generally cylindrical cross-sectional configuration with a central portion 70 of enlarged outside diameter providing a valve head portion connecting a valve actuating portion 72 and a spring receiving stub shaft portion 74 of reduced diameter. Radially extending shoulders 76, 78 provide, respectively, a spring abutment surface and an O-ring abutment surface. The front end surface 80 is rounded to facilitate engagement with an animal rubbing thereagainst and to facilitate opening of the valve plunger by more or less axially directed force components. The cylindrical valve actuating portion 72 is elongated so that the rounded front end surface terminates well beyond the front end surface 50 of the housing 20 with the cylindrical outer surface 82 of the valve actuating portion being substantially axially coextensive with the outlet opening 48 in both the closed position shown in FIG. 2 and all open positions, one of which is shown in FIG. 4, axially rearwardly displaced relative thereto. Thus, relative axial movement of the valve actuating portion in the passage 84 serves to prevent entrance of clogging materials through outlet opening 48 and tends to provide a self-cleaning action. The outside diameter of the valve actuating portion 72 is substantially less than the inside diameter of the outlet opening 48 so as to define an elongated toroidal flow passage 84 of substantial width and length. However, in order to dispense a desired minimum quantity of oil and insecticide without exceeding a desired maximum quantity, the diameter of the valve actuating portion 72 must not be too small relative to the diameter of the outlet opening. It has been determined that best results are attainable when the diameter of outlet opening 48 is approximately 0.226 inch, as previously stated, and the diameter of valve actuating portion 72 is approximately 0.205 inch whereby the cross sectional area of the outlet passage 84 is approximately 0.0071052 square inch, approximately 21.5% of the cross-sectional area of the valve actuating portion of 0.0329894 square inch. It is believed that the cross-sectional area of the outlet passage 84 should be kept within a range of approximately 18.5 to 25% of the area of the valve actuating portion in order to achieve best results.

The O-ring type seal means 24 of the presently preferred form of the invention is of standard number 7 size with an inside diameter of approximately 0.14 inch such as to be slidably sealingly mounted over valve actuating portion 72 during assembly and frictionally retained thereon in abutting engagement with shoulder 78 in operation. The outside diameter of the O-ring is approximately 0.28 inch, substantially less than the inside diameter of approximately 0.355 inch of the chamber 36 so as to provide a substantial gap therebetween, as shown in FIG. 4, defining a flow passage capable of permitting sufficient flow of oil and insecticide from chamber 36 to outlet opening 48 to continuously fill flow passage 84 and dispense the oil and insecticide in a more or less continuous cylindrical stream around valve actuating portion 72 in the open position. In the closed position of FIG. 2, the O-ring 24 sealingly abuts the correspondingly curved end wall surface 46 to positively prevent both flow and leakage of oil and insecticide. An important factor in obtaining relatively long periods of maintenance free use of the dispensing valve apparatus of the present invention is recognition of the fact that many O-ring sealing materials are subject to substantial swelling, degradation, and deterioration in association with the oil and insecticide liquid used for cattle. I have determined that best results, and in many situations satisfactory results, require a fluro-carbon material of relatively high density on the order of 800 to 850 which may be characterized by a Shore A hardness of approximately 75, a tensile strength of approximately 1800 to 2000 psi, a percentage elongation of approximately 200, a modulus of elasticity at 100% elongation of approximately 800 to 850, and a specific gravity of approximately 1.86. A material of this type will exhibit relatively little change in physical characteristics when subject to varying environments including immersion in various liquids which are readily absorbed by or reactive with other materials. Exemplary test results indicate 0 to 1% change in hardness, 4.5 to 10.0% change in tensile strength, 3.0 to 5.5% change in elongation, and 0 to 1.6% change in volume after immersion in various solvents, such as 70% iso-octane with 30% toluene, for 70 hours at room temperature. Such material is commercially available from Parker Seal Company of Culver City, California under the tradename Viton and the product numbers V747–75 and 77–545.

The compression spring means 26 is made of steel with an inside diameter of approximately 0.265 inch so as to permit several turns to be loosely slidably received circumjacent the cylindrical spring receiving stub shaft portion 74 of approximately 0.205 inch diameter. The inner end of the spring is seated on washer means 28 and the effective length of the spring is such as to be compressed and to exert a closing force on the valve plunger means 22 in the closed position of FIG. 2. Thus the spring exerts a continuous closing force on the valve plunger means and is of suitable strength to obtain the desired sealing effect in the closed position while permitting relatively easy opening by cattle rubbing against the rounded end surface 80. The outside diameter of the spring is substantially less than the inside diameter of the chamber 36 whereby sufficient relative movement is permitted to prevent jamming as the cattle push, roll and bang against the apparatus.

The retaining washer means 28 is also made of steel and is held against end wall 38 by the compression spring. An inlet opening 90 in the washer permits the chamber 36 to be filled with oil and insecticide through inlet opening 42 from a reservoir (not shown) which fills the space 92 surrounding the valve assembly by gravity feed in a conventional manner.

While the inventive concepts have been hereinbefore described by reference to an illustrative and presently preferred dispensing valve apparatus embodiment thereof, it is intended that the terms of the appended claims be construed to cover alternative embodiments except insofar as limited by the prior art.

I claim:

1. Apparatus for dispensing fluid such as oil and insecticide or the like to livestock rubbing thereagainst comprising:
   support means defining a fluid storage chamber including a support wall,
   a mounting bore extending through said wall,
   valve housing means of one piece plastic material fixedly mounted in said mounting bore,
   an elongated chamber defined by said valve housing means and having an inlet opening at one end in fluid communication with said fluid storage chamber and an outlet opening at the opposite end in fluid communication with the atmosphere,
   valve plunger means of one piece plastic material including a valve head portion slidably reciprocably mounted in said elongated chamber for movement between a closed position relative to said outlet opening and variable axially inwardly located open positions relative thereto, spring means mounted in said elongated chamber and resiliently biasing said valve plunger means to the closed position, a valve actuating portion of said valve plunger means extending outwardly from said elongated chamber through said outlet opening and terminating in a nose portion located outwardly of said support means and said valve housing means a distance sufficient to enable operative engagement with livestock rubbing thereagainst, an O-ring type sealing member mounted on said valve actuating portion in sealing member mounted on said valve actuating portion in sealing engagement therewith and with said valve head portion and being sealingly engageable with said valve housing means in a closed position relative to said outlet opening, said sealing member being movable with said valve plunger means to variably axially inwardly displaced open positions relative to said outlet opening and being made of a flurocarbon plastic material which is relatively inert and impermeable to the fluid being dispensed, a cylindrical mounting wall on said housing means adjacent said outlet opening and forming part of said elongated chamber and being resiliently compressible, a cylindrical mounting surface on said mounting wall having a diameter sufficiently greater than the diameter of said mounting bore as to resilient compress said mounting wall and compressibly fixedly frictional retain said housing means in said mounting bore, an end wall on said housing means located outwardly beyond said support wall, a radially extending portion of said end wall extending radially outwardly beyond said mount bore, an abutment surface on said radially extending portion abuttingly engaging said support wall circumjacent said mounting bore, an outer surface on said end wall intersecting said abutment surface and defining a relatively thin terminal edge to reduce restrictive contact with livestock rubbing thereagainst said outlet opening being an axially elongated cylindrical bore, said valve actuating portion having an axial extending cylindrical outer surface coextensive with said elongated cylindrical bore in all open positions of said valve plunger means, the outside diameter of said cylindrical outer surface being sufficiently less than the diameter of said axially elongated cylindrical bore to define a toroidal dispensing passage having a cross-sectional area within a range of approximately 18.5% to 25% of the cross-sectional area of said valve actuating portion along said cylindrical outer surface, said cross-sectional area of said toroidal dispensing passage being approximately 21.5% of the cross-sectional area of said valve actuating portion along said cylindrical outer surface, said outer surface being convexly curved relative to said mounting wall, a radially outwardly extending abutment surface connecting said valve head portion to said valve actuating portion, said valve actuating portion having a cylindrical outer surface of substantially constant diameter extending axially outwardly from said radially outwardly extending abutment surface, and said O-ring sealing member having an inside diameter sufficiently smaller than the diameter of said cylindrical outer surface so as to be frictionally retained thereon in abutting engagement with said radially outwardly extending surface during movement of said valve plunger means between the closed position and the open positions.

2. Apparatus for dispensing fluid such as oil and insecticide or the like to livestock rubbing thereagainst comprising:

support means defining a fluid storage chamber including a support wall, a mounting bore extending through said wall, valve housing means of one piece plastic material fixedly mounted in said mounting bore, an elongated chamber defined by said valve housing means and having an inlet opening at one end in fluid communication with said fluid storage chamber and an outlet opening at the opposite end in fluid communication with the atmosphere, an end wall on said housing means located outwardly beyond said support wall, a radially extending portion of said end wall extending radially outwardly beyond said mounting bore, an abutment surface on said radially extending portion abuttingly engaging said support wall circumjacent said mounting bore, an outer surface on said end wall intersecting said abutment surface and defining a relatively thin terminal edge to reduce restrictive contact with livestock rubbing thereagainst, valve plunger means including a valve head portion slidably reciprocably mounted in said elongated chamber for movement between a closed position relative to said outlet opening and variable axially inwardly located open positions relative thereto, spring means mounted in said elongated chamber and resiliently biasing said valve plunger means to the closed position, a valve actuating portion of said valve plunger means extending outwardly from said elongated chamber through said outlet opening and terminating in a nose portion located outwardly of said support means and said valve housing means a distance sufficient to enable operative engagement with livestock rubbing thereagainst, and an O-ring type sealing member mounted on said valve actuating portion in sealing engagement therewith and with said valve head portion and being sealingly engageable with said valve housing means in a closed position relative to said outlet opening, said sealing member being movable with said valve plunger means to variably axially inwardly displaced open positions relative to said outlet opening and being made of a material which is relatively inert and impermeable to the fluid being dispensed.

3. The invention as defined in claim 2 and wherein said outer surface being convexly curved relative to said mounting wall.

4. Apparatus for dispensing fluid such as oil and insecticide or the like to livestock rubbing thereagainst comprising:

support means defining a fluid storage chamber including a support wall, a mounting bore extending through said wall, valve housing means of one piece plastic material fixedly mounted in said mounting bore, an elongated chamber defined by said valve housing means and having an inlet opening at one end in fluid communication with said fluid storage chamber and an outlet opening at the opposite end in fluid communication with the atmosphere, a cylindrical mounting wall on said housing means adjacent said outlet opening and forming part of said elongated chamber and being resiliently compressible, a cylindrical mounting surface on said mounting wall having a diameter sufficiently greater than the diameter of said mounting bore as to resilient compress said mounting wall and compressibly fixedly frictional retain said housing means in said mounting bore, an end wall of said housing means located outwardly beyond said support wall, a radially extending portion of said end wall extending radially outwardly beyond said mounting bore, an abutment surface on said radially extending portion abuttingly engaging said support wall circumjacent said mounting bore, an outer surface on said end wall intersecting said abutment surface and defining a relatively thin terminal edge to reduce restrictive contact with livestock rubbing thereagainst, valve plunger means of one piece plastic material including a valve head portion slidably reciprocably mounted in said elongated chamber for movement between a closed position relative to said outlet opening and variable axially inwardly located open positions relative thereto, spring means mounted in said elongated chamber and resiliently biasing said valve plunger means to the closed position, a valve actuating portion of said valve plunger means extending outwardly from said elongated chamber through said outlet opening and terminating in a nose portion located outwardly of said support means and said valve housing means a distance sufficient to enable operative engagement with livestock rubbing thereagainst, and an O-ring type sealing member mounted on said valve actuating portion in sealing engagement therewith and with said valve head portion and being sealingly engageable with said valve housing means in a closed position relative to said outlet opening, said sealing member being movable with said valve plunger means to variably axially inwardly displaced open positions relative to said outlet opening and being made of a flurocarbon plastic material which is relatively inert and impermeable to the fluid being dispensed.

* * * * *